US008204659B2

(12) United States Patent
Kouno et al.

(10) Patent No.: US 8,204,659 B2
(45) Date of Patent: Jun. 19, 2012

(54) ENGINE START CONTROL SYSTEM FOR HYBRID VEHICLE

(75) Inventors: Kazuyuki Kouno, Hiratsuka (JP); Tomoyuki Kodawara, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1156 days.

(21) Appl. No.: 12/034,268

(22) Filed: Feb. 20, 2008

(65) Prior Publication Data

US 2008/0228363 A1  Sep. 18, 2008

(30) Foreign Application Priority Data

Mar. 12, 2007 (JP) ................................. 2007-062263
Dec. 28, 2007 (JP) ................................. 2007-339959

(51) Int. Cl.
*G06F 17/00* (2006.01)

(52) U.S. Cl. ................ 701/55; 701/22; 701/54; 701/67; 477/5; 477/181; 180/65.28

(58) Field of Classification Search .................. 701/22, 701/54, 67, 68; 477/5, 6, 167, 176, 180, 477/181; 180/65.265, 65.275, 65.285, 65.28; 903/912, 914, 916
See application file for complete search history.

(56) References Cited

U.S. PATENT DOCUMENTS

| | | | |
|---|---|---|---|
| 7,357,204 B2 * | 4/2008 | Hisada et al. ............. 180/65.285 |
| 7,396,316 B2 * | 7/2008 | Tabata et al. ................... 477/107 |
| 7,477,031 B2 * | 1/2009 | Ogata et al. .................... 318/430 |
| 7,503,872 B2 * | 3/2009 | Tabata et al. ........................ 477/5 |
| 7,549,944 B2 * | 6/2009 | Tabata et al. ........................ 477/5 |
| 7,578,364 B2 * | 8/2009 | Ohno .......................... 180/65.28 |
| 7,771,310 B2 * | 8/2010 | Tanishima ......................... 477/5 |
| 8,010,264 B2 * | 8/2011 | Ogata et al. ...................... 701/55 |
| 2003/0104901 A1 | 6/2003 | Fukushima et al. |
| 2005/0101433 A1 * | 5/2005 | Joe ..................................... 477/5 |
| 2005/0155803 A1 * | 7/2005 | Schiele .......................... 180/65.2 |
| 2006/0089235 A1 * | 4/2006 | Kobayashi .................... 477/107 |

(Continued)

FOREIGN PATENT DOCUMENTS

EP   0 922 600 A2   6/1999

(Continued)

OTHER PUBLICATIONS

Kozo Yamaguchi, Hybrid Vehicle, Jan. 10, 1997, JPO, JP 09-009414 A, English Abstract.*

(Continued)

*Primary Examiner* — Paul N Dickson
*Assistant Examiner* — James English
(74) *Attorney, Agent, or Firm* — Young Basile

(57) ABSTRACT

An engine start control system for starting the engine of a hybrid vehicle operated in an EV drive mode. The system responds quickly to an acceleration request while limiting unpleasant deceleration sensations. The hybrid vehicle has a first clutch disposed between the engine and motor/generator. An electric drive mode exists in which the first clutch is disengaged and the driving torque is provided only by the motor/generator, and a hybrid drive mode exists in which the first clutch is engaged and the driving torque is provided by both the engine and motor/generator. The system uses an engine start shift pattern that is high-geared as compared with a normal shift pattern. Shift control of the transmission is performed using the engine start shift pattern when an engine start request arises. The engine is started by controlling the engagement of the first clutch after performing the shift control.

14 Claims, 8 Drawing Sheets

U.S. PATENT DOCUMENTS

| | | | |
|---|---|---|---|
| 2006/0166784 A1* | 7/2006 | Tabata et al. | 477/37 |
| 2007/0102207 A1* | 5/2007 | Yamanaka et al. | 180/65.3 |
| 2007/0199745 A1* | 8/2007 | Hayashi | 180/65.2 |
| 2007/0275818 A1* | 11/2007 | Kouno | 477/3 |
| 2012/0072065 A1* | 3/2012 | Minamikawa et al. | 701/22 |

FOREIGN PATENT DOCUMENTS

| | | | |
|---|---|---|---|
| EP | 1 762 452 A2 | | 3/2007 |
| EP | 1 839 986 A1 | | 10/2007 |
| JP | 09009414 A | * | 1/1997 |
| JP | Hei 11-082260 | | 3/1999 |

OTHER PUBLICATIONS

Kozo Yamaguchi, Hybrid Vehicle, Jan. 10, 1997, JPO, JP 09-009414 A, Machine Translation of Description.*

Hyeoun-Dong Lee et al., "Advance Gear Shifting and Clutching Strategy for Parallel Hybrid Vehicle with Automatic Manual Transmission," Industry Applications Conference 1998, Thirty-Third IAS Annual Meeting 1998, IEEE, St. Louis, MO Oct. 12-15, 1998, vol. 3, Oct. 12, 1998, pp. 1709-1713, XP010312869, ISBN: 978-0-7803-4943-8 (IEEE, NY, NY).

* cited by examiner

ENGINE START CONTROL SYSTEM FOR HYBRID VEHICLE

CROSS-REFERENCE TO RELATED APPLICATIONS

This application claims priority from Japanese Patent Application Serial Nos. 2007-062263, filed Mar. 12, 2007, and 2007-339959, filed Dec. 28, 2007, each of which is incorporated herein in its entirety by reference.

TECHNICAL FIELD

The invention relates to an engine start control system for a hybrid vehicle having an electric drive mode, wherein the vehicle is propelled solely by a motor/generator, and a hybrid drive mode, wherein the vehicle is propelled by both an engine and by the motor/generator, and more particularly to an engine start control system that controls a mode change from the electric drive mode to the hybrid drive mode.

BACKGROUND

Various types of drive systems for hybrid vehicles are known. For example, Japanese Publication No. 11-082260 shows a hybrid drive system that has a motor/generator disposed between an engine and a transmission. A first clutch is provided to selectively engage and disengage the engine with respect to the motor/generator, and a second clutch is provided to selectively engage and disengage the motor/generator with respect to the transmission.

In a hybrid vehicle having the above-described hybrid drive system, when the first clutch is disengaged and the second clutch is engaged, the electric drive mode is selected, and the vehicle is propelled solely by the motor/generator. On the other hand, when both of the first and second clutches are engaged, the hybrid drive mode is selected, and the vehicle is propelled by both the engine and the motor/generator. When the motor/generator cannot produce sufficient driving during the EV drive mode, the mode changes from the EV drive mode to the HEV drive mode. This mode change is done through an engine start by engaging the first clutch and cranking the engine using an engine-cranking-torque supplied by the motor/generator. Thus, during the mode change from the EV drive mode to the HEV drive mode, the motor/generator is required to supply not only a driving motor torque needed for the EV drive of the vehicle, but also the engine-cranking-torque needed to start the engine.

BRIEF SUMMARY

Engine start control systems for hybrid vehicles are taught herein. The hybrid vehicle includes an engine, a motor/generator, a first clutch disposed between the engine and the motor/generator and a transmission connected to the motor/generator. The hybrid vehicle has an electric drive mode in which the first clutch is disengaged and the driving torque is provided only by the motor/generator and a hybrid drive mode in which the first clutch is engaged and the driving torque is provided by both the engine and the motor/generator.

One control system taught for such a vehicle comprises a controller configured to determine when an engine start request for a mode change from the electric drive mode to the hybrid drive mode arises, select an engine start shift pattern for the transmission when the engine start request arises, the engine start shift pattern being a high-geared pattern as compared with the normal shift pattern, perform shift control of the transmission in accordance with the engine start shift pattern when the engine start request arises and engage the first clutch and start the engine using an engine-cranking-torque of the motor/generator after performing the shift control.

This and other engine start control systems and methods are taught herein.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
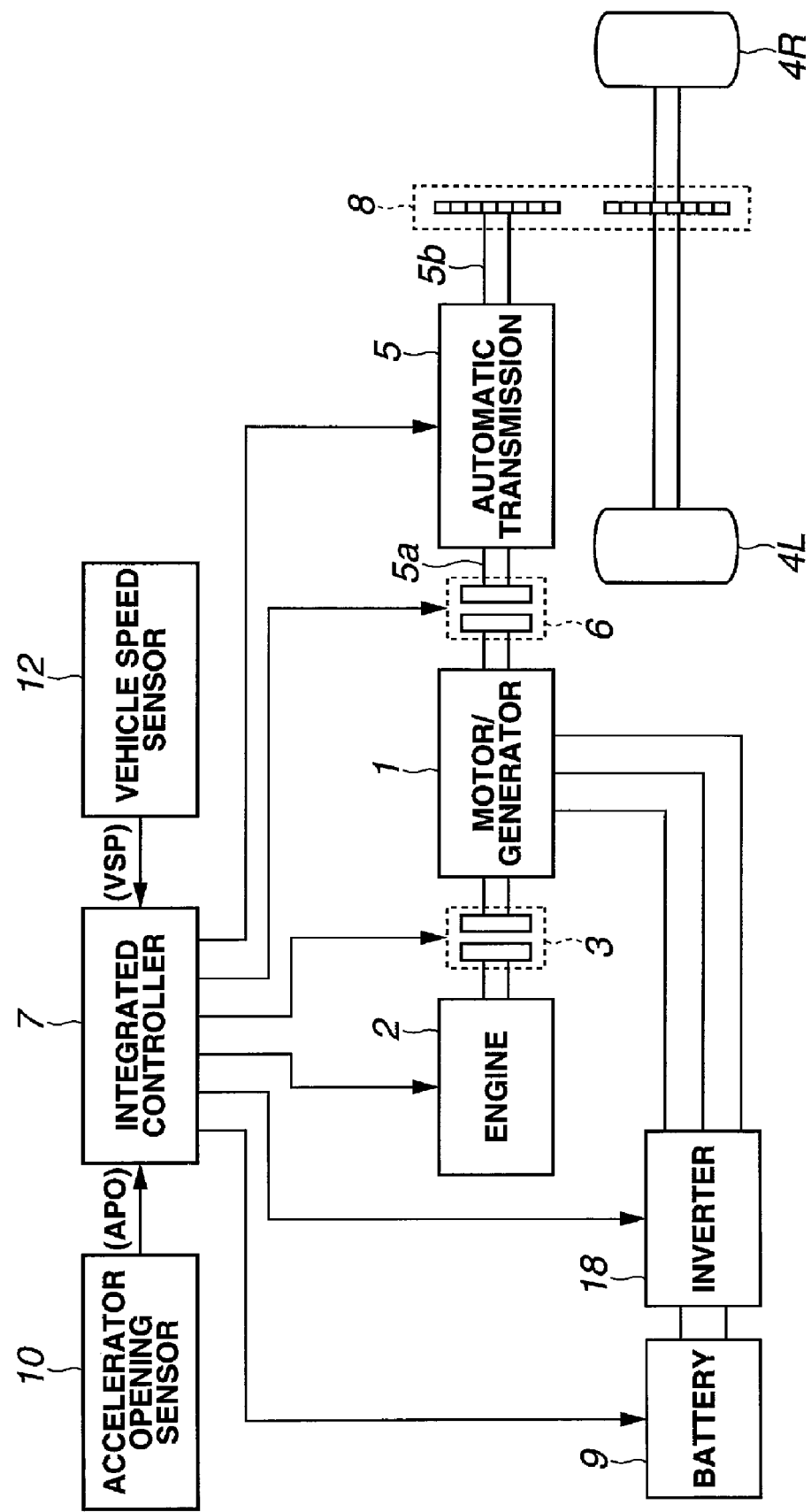
FIG. 1 is a block diagram showing a power train of a hybrid vehicle incorporating an engine start control system according to an embodiment of the invention.

Hereinafter, embodiments of the invention are described in detail with reference to the drawings. FIG. 1 shows a power train for a hybrid vehicle that has a motor/generator 1 and an engine 2. A first clutch 3 is disposed between the motor/generator 1 and the engine 2 to transfer and disconnect torque by way of its engagement and disengagement. The power train also has an automatic transmission 5 and a final speed reducer 8 that cooperate to transfer power from the motor/generator 1 and the engine 2 to a left driving wheel 4L and a right driving wheel 4R (left and right rear wheels in this example). A second clutch 6 is disposed between the motor/generator 1 and the automatic transmission 5 to transfer and disconnect torque by way of its engagement and disengagement. The power train further includes an integrated controller 7 that functions as a control system that comprehensively controls the motor/generator 1, the engine 2, the first clutch 3, the automatic transmission 5 and the second clutch 6. The controller 7 can be an engine control unit (ECU), that is, a microcomputer including a random access memory (RAM), a read-only memory (ROM) and a central processing unit (CPU) in addition to various input and output connections. Generally, the control functions described herein are implemented by one or more software programs stored in internal or external memory and are performed by execution by the CPU. Of course, some or all of the functions can be implemented by hardware components. Although one controller 7 is shown, more than one is possible.

The hybrid vehicle of this embodiment has an electric drive (EV) mode and a hybrid drive (HEV) mode. In the EV mode, the vehicle is propelled solely by the motor/generator 1 during low road, low speed travel, including at start of the vehicle from a stop state. In the HEV mode, the vehicle is propelled by the engine 2 and the motor/generator 1 during high speed travel, high (large) load travel and where a battery 9 that powers the motor/generator 1 cannot provide sufficient electric power.

The automatic transmission 5 is arranged in tandem with the engine 2 in a front to rear direction with respect to the vehicle, as in conventional rear-wheel-drive vehicles. Rotational force from the crank shaft of the engine 2 is transferred to an input shaft 5a of the automatic transmission 5 through the motor/generator 1. The first clutch 3 is installed between the motor/generator 1 and the engine 2 and can engage and disengage the motor/generator 1 with respect to the engine 2. The second clutch 6 is installed between the motor/generator 1 and the automatic transmission 5 and can engage and disengage the motor/generator 1 with respect to the automatic transmission 5.

The motor/generator 1 here is an alternating current synchronous motor and is arranged between the engine 2 and the automatic transmission 5. The motor/generator 1 acts as a motor when supplying power to the left and right driving wheels 4L, 4R and acts as a generator when the hybrid vehicle is decelerated using regenerative braking.

The automatic transmission 5 determines a drive line (a shift or speed stage) by selectively engaging or disengaging (releasing) a plurality of shift frictional elements (clutch and brake etc., not shown in detail). In this manner, the automatic transmission 5 changes speed of the rotation of a transmission output shaft 5b with respect to the input shaft 5a according to a transmission ratio that corresponds to a selected speed state. The output rotation (or torque of this output rotation) of the transmission output shaft 5b is separately transferred to the left and right rear wheels 4L, 4R through the final speed reducer 8 including a differential gear device, constituting the transmission unit.

In a case where the EV drive mode is required, the engine 2 is stopped, the first clutch 3 is disengaged, the second clutch 6 is engaged, and the automatic transmission 5 is set to a power transmission state. When driving the motor/generator 1 in this condition, only the output rotation from the motor/generator 1 is transferred to the transmission input shaft 5a of the automatic transmission 5. The automatic transmission 5 changes the speed of the input rotation from the input shaft 5a according to the selected speed stage and outputs the rotation through the transmission output shaft 5b. This rotation from the transmission output shaft 5b is transferred to the left and right rear wheels 4L, 4R through the final speed reducer 8. With this, the vehicle travels only by power from the motor/generator 1.

In a case where it necessary to change the mode from the EV drive mode to the HEV drive mode, the engine 2 has to be started. The engine is started by increasing a rotation or revolution speed of the engine 2 by way of engaging the first clutch 3 and cranking the engine 2 with an engine-cranking-torque of the motor/generator 1. Then, in the HEV drive mode, each of the first and second clutches 3 and 6 is engaged, and the automatic transmission 5 is set to the power transmission state. In this condition, the output rotation from the engine 2, or the combined output rotation from the engine 2 and from the motor/generator 1, is input to the transmission input shaft 5a. The automatic transmission 5 changes the speed of the input rotation from the input shaft 5a according to the selected speed stage and outputs the rotation through the transmission output shaft 5b. The rotation of the transmission output shaft 5b is transferred to the left and right rear wheels 4L, 4R through the final speed reducer 8. With this, the vehicle travels by power from both of the engine 2 and the motor/generator 1.

During the HEV drive mode, there is a case where a surplus of energy is produced when the engine 2 is driven under an optimum fuel efficiency condition. In this case, the motor/generator 1 works as a generator by using the surplus energy to generate electric power. Then, by storing the generated electric power for subsequent use by the motor/generator 1, the fuel economy of the engine 2 can be improved.

In order to control the above power train shown in FIG. 1, the controller 7 receives an input signal from an accelerator opening sensor 10 that detects an accelerator opening APO (a depression amount of an accelerator pedal) of the accelerator pedal and an input signal from a vehicle speed sensor 12 that detects a vehicle speed VSP of the hybrid vehicle.

Here, the controller 7 controls and drives the motor/generator 1 by the power from the battery 9 through an inverter 18. However, when the motor/generator 1 acts as the generator as described above, the electric power generated by the motor/generator 1 is stored in the battery 9. At this time, in order to prevent an overcharge of the battery 9, the controller 7 detects a charge state (the usable electric power) of the battery 9 and controls the charge state of the battery 9.

The controller 7 selects the drive mode that can obtain a driver's desired driving force of the vehicle, namely either one of the EV drive mode or the HEV drive mode, from the accelerator opening APO and the vehicle speed VSP respectively detected by the accelerator opening sensor 10 and the vehicle speed sensor 12. More specifically, as shown by example in a drive mode area map in FIG. 8 (described later), in a case of an area of a predetermined low accelerator opening and a predetermined low vehicle speed, the EV drive mode is selected. Except for this area, the HEY drive mode is selected. In addition, the controller 7 calculates an engine torque target value, a motor/generator torque target value, a first clutch transmission torque capacity target value, a second clutch transmission torque capacity target value and a target speed stage of the automatic transmission 5.

Further, based on this calculated result, the controller 7 controls the engine 2 through an electronic throttle actuator (not shown) so that the engine torque reaches the engine torque target value, and also controls the motor/generator 1 by the power from the battery 9 through the inverter 18 so that the torque of the motor/generator 1 reaches the motor/generator torque target value.

Furthermore, the controller 7 controls the engagement of each of the first clutch 3 and the second clutch 6 through an electromagnetic or hydraulic solenoid (not shown) so that transmission torque capacities of the first clutch 3 and the second clutch 6 reach the first clutch transmission torque capacity target value and the second clutch transmission torque capacity target value, respectively.

Moreover, the controller 7 performs a shift control of the automatic transmission 5 through a hydraulic control unit (not shown) of the automatic transmission 5 so that the speed stage of the automatic transmission 5 becomes the target speed stage (a target transmission ratio).

Figure 7A:
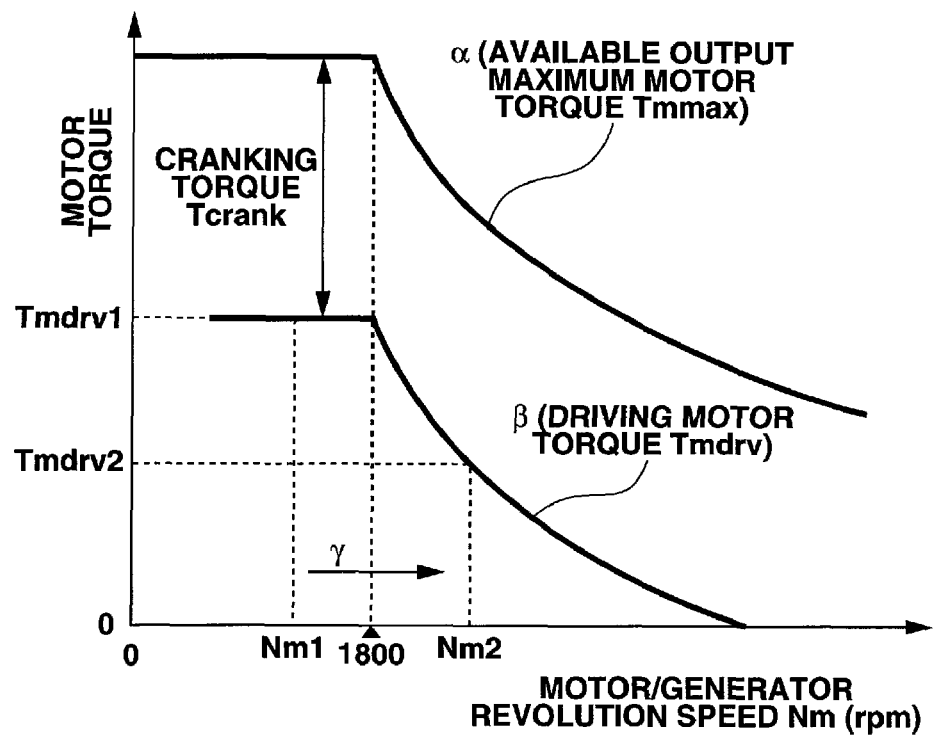
FIG. 7A is a diagram showing torque characteristic lines that describe the motor torque characteristics of a motor/generator.
Figure 7B:
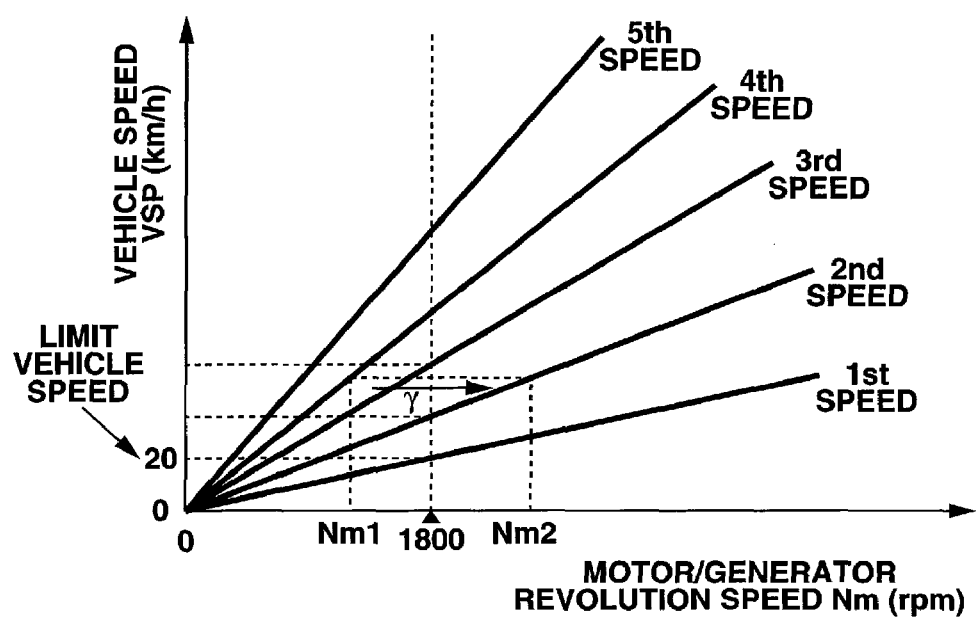
FIG. 7B is a diagram showing vehicle speed characteristic lines that describe the vehicle speed for each shift of the transmission with respect to motor revolution speed of the motor/generator.
Figure 8:
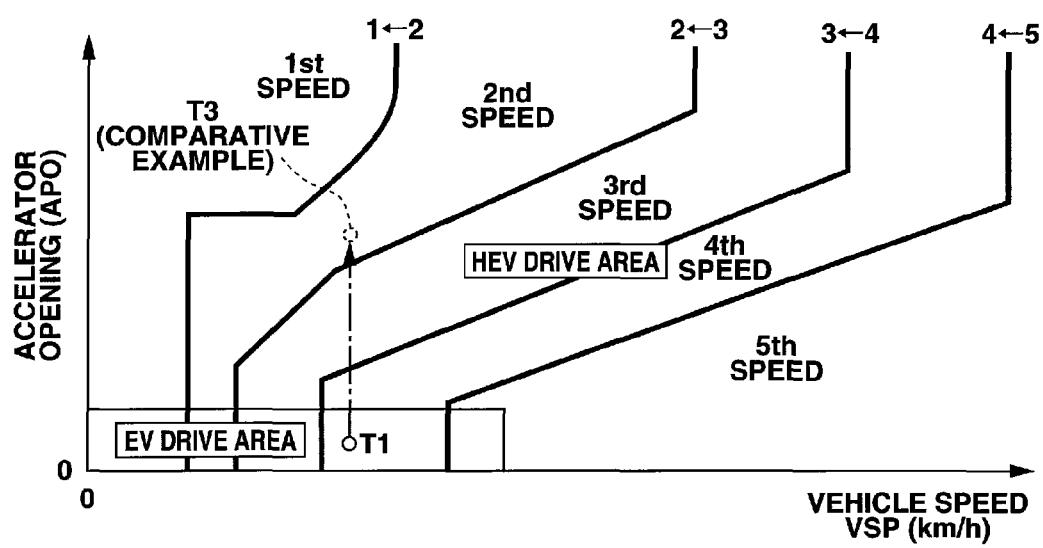
FIG. 8 is a drawing that shows a normal shift pattern showing a down-shift line of the automatic transmission at the normal vehicle drive, and a drive mode area map showing an EV drive mode area and a HEV drive mode area.

The target speed stage of the automatic transmission 5 at each the EV and HEV drives is determined by mapping of the accelerator opening APO and the vehicle speed VSP onto a normal shift pattern (here shown by only down-shift lines), which is preset in a two-dimensional map of the vehicle speed VSP and the accelerator opening APO (the depression amount of the accelerator pedal) as exemplified in FIG. 8. Conventionally, even at the mode change from the EV drive mode to the HEV drive mode, the above normal shift pattern has been used. Because of this, the following problem arises. FIG. 7A illustrates torque characteristic lines showing a motor torque characteristic of a motor/generator. A line α is a characteristic of variations of an available output maximum motor torque Tmmax with respect to the motor revolution speed Nm (in rpm) of the motor/generator. A line β is a characteristic line of values obtained by subtracting a predetermined engine-cranking-torque Tcrank needed for the engine start from the available output maximum motor torque Tmmax, which result is indicated as a driving motor torque Tmdrv. FIG. 7B illustrates vehicle speed characteristic lines showing the vehicle speed (km/h) for each shift or speed stage of the transmission with respect to the revolution speed Nm of the motor/generator.

As shown in FIG. 7A, when the motor revolution speed exceeds a certain value (for instance, over 1800 rpm), the available output maximum motor torque Tmmax of the motor/generator 1 decreases as the motor revolution speed increases. Consequently, when the motor revolution speed exceeds the value, the driving motor torque Tmdrv decreases as the motor revolution speed increases.

Conventionally, the automatic transmission in a hybrid vehicle is configured such that the shift is performed on the basis of a shift pattern such as that shown in FIG. 8 both during operation in the EV and HEV drive modes as well as during the mode change from the EV drive mode to the HEV drive mode. For this reason, when the engine 2 is started by the engine-cranking-torque Tcrank of the motor/generator 1, and the shift is performed by the automatic transmission 5 to shift the mode to the HEV drive mode in response to the driver's acceleration request during the EV drive mode, as indicated by an arrow γ in FIG. 7B, there is a case where the motor revolution speed Nm increases from Nm1 to Nm2. In this case, as shown in FIG. 7A, the driving motor torque Tmdrv (line β) greatly reduces from Tmdrv1 to Tmdrv2, and this can cause the driver to experience an unpleasant or uncomfortable deceleration sensation.

Furthermore, in order to prevent the unpleasant deceleration feeling to the driver when starting the engine 2 from the EV drive, it might be possible to start the engine 2 with the driving motor torque Tmdrv held at a level of the Tmdrv1 by performing slip control of the first clutch 3 under a condition in which the motor revolution speed Nm is in an increased state from Nm1 to Nm2 by the shift (down-shift). However, in this case, the engine-cranking-torque Tcrank used for the engine start decreases. Thus, the time required to start the engine increases, thereby causing a delay in response to the acceleration request.

Figure 4:
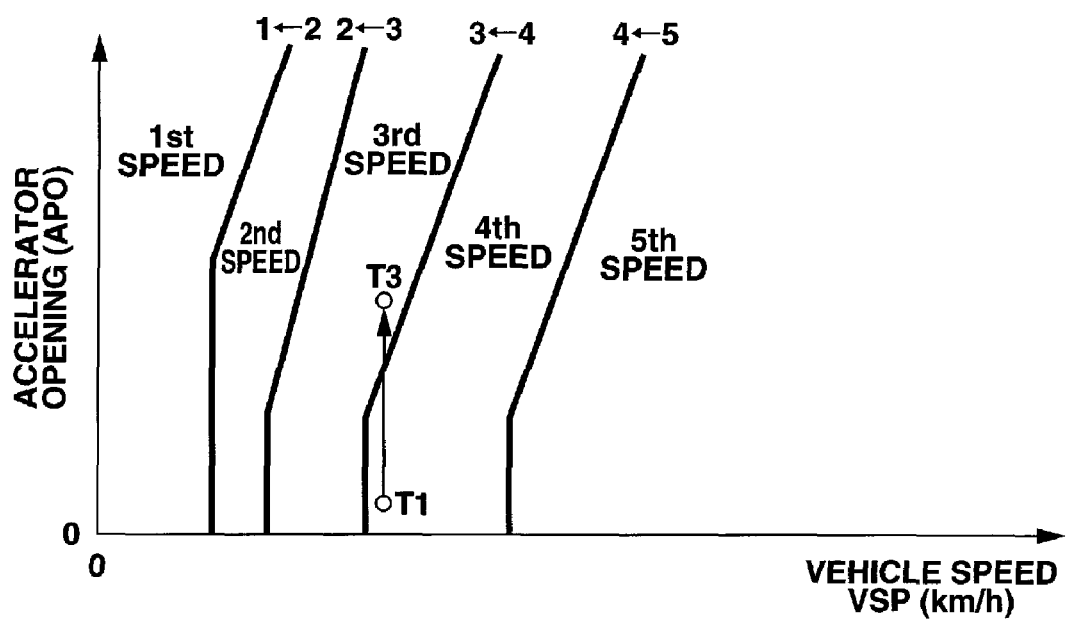
FIG. 4 is a diagram that shows an engine start shift pattern showing a down-shift line of an automatic transmission, which is used at the engine start when the controller shifts the mode from the electric drive (EV) mode to a hybrid drive (HEV) mode.

Accordingly, to achieve the engine start at the mode change from the EV drive mode to the HEV drive mode in embodiments of the invention, as shown in FIG. 4 an engine start shift pattern preset in a two-dimensional map of the vehicle speed VSP and the accelerator opening APO is provided in lieu of the shift pattern of FIG. 8. The engine start shift pattern shown in FIG. 4 is set to higher or upper speed stage side (high-geared side) in an area of large accelerator opening APO with respect to the conventional shift pattern. More specifically, the engine start shift pattern is set such that the down-shift of the automatic transmission 5 is possible within a revolution speed range (for example, under 1800 rpm in the case of FIG. 7A) of the motor/generator 1, where limitation does not arise for the driving motor torque Tmdrv obtained by subtracting the predetermined engine-cranking-torque Tcrank needed for the engine 2 start from the available output maximum motor torque Tmmax of the motor/generator 1.

Further, the controller 7 can calculate a variation in a unit of time of the accelerator opening APO (a depression velocity ASP of the accelerator pedal) by detecting the input signal from the accelerator opening sensor 10 over a unit of time. The engine start from the EV drive according to the state of the driver's acceleration request is achieved by executing the following control program by using this acceleration depression velocity ASP and the vehicle speed VSP.

Figure 2:
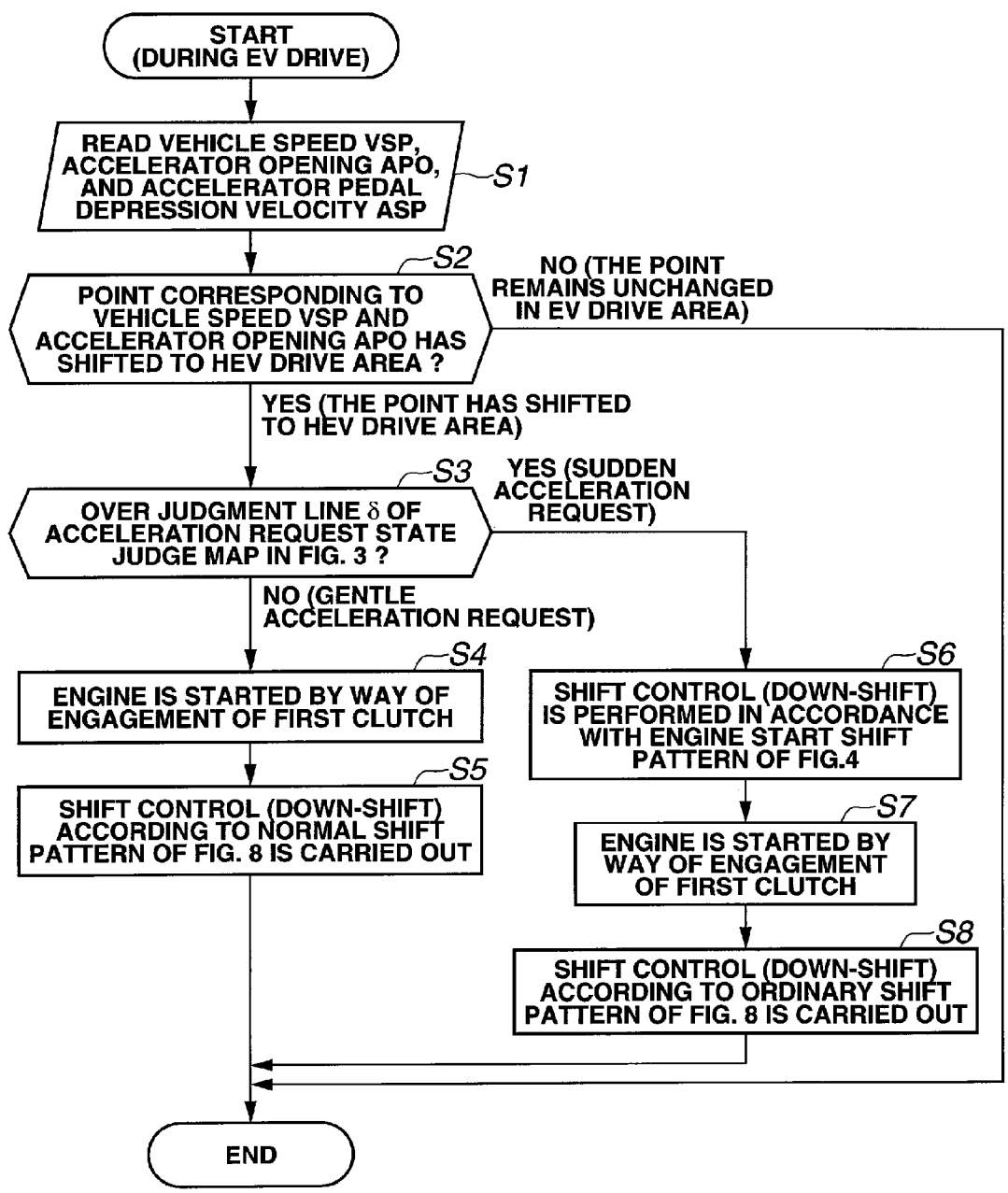
FIG. 2 is a flow chart showing engine start control from an electric drive (EV) mode executed by an integrated controller according to FIG. 1.

The control program of FIG. 2 is a routine that the controller 7 executes using the input of the input signal from the accelerator opening sensor 10 during the EV drive mode. First, at step S1 the vehicle speed VSP, the accelerator opening APO and the accelerator pedal depression velocity ASP are read.

Next, at step S2 a judgment is made as to whether or not a point corresponding to the vehicle speed VSP and the accelerator opening APO has shifted from an EV drive area to a HEV drive area, i.e., whether or not an engine start is necessary, by putting the vehicle speed VSP and the accelerator opening APO read at step S1 on the drive mode area map of FIG. 8. In a case where the judgment is YES (the point has shifted to the HEV drive area) at step S2, the routine proceeds to next step S3. If NO (the point remains unchanged in the EV drive area) at step S2, this control is terminated.

Figure 3:
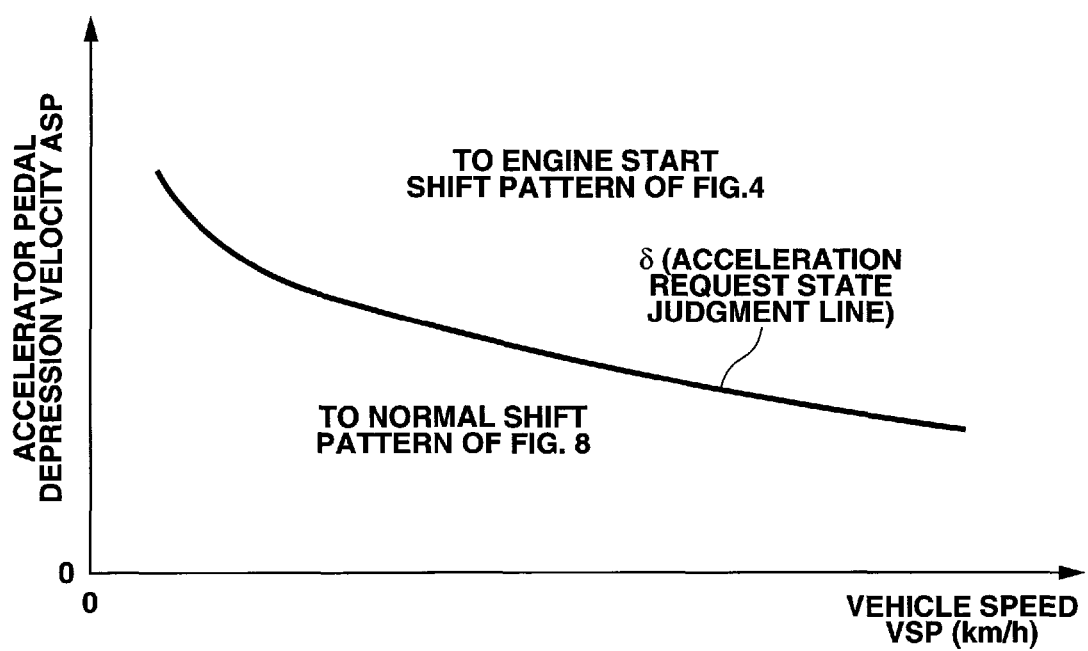
FIG. 3 is a diagram showing a judgment map used for judging a state of driver's desired acceleration.

Further, at step S3 a judgment is made as to whether the driver's acceleration request is an abrupt or sudden acceleration or a gentle acceleration by judging whether the accelerator pedal depression velocity ASP for the vehicle speed VSP is greater than or equal to a judgment line δ of an acceleration request state judge map in FIG. 3. That is to say, when a value of the accelerator pedal depression velocity ASP for the vehicle speed VSP meets or exceeds a predetermined value represented by the judgment line δ or above the judgment line δ of FIG. 3, the acceleration request is judged to be a sudden acceleration request. On the other hand, when the value is below the judgment line δ, the acceleration request is judged to be a gentle acceleration request.

When the judgment of step S3 is NO (the gentle acceleration request), the routine proceeds to step S4. At step S4 the engine 2 is started by way of the engagement of the first clutch 3. Afterwards, at step S5 the shift control (down-shift) according to the normal shift pattern of FIG. 8 is carried out, and this control is terminated as the control shifts to the normal drive control.

On the other hand, when the judgment of step S3 is YES (indicating a sudden acceleration request), the routine proceeds to step S6. At step S6 the shift control (down-shift) is performed in accordance with the engine start shift pattern of FIG. 4, and the routine proceeds to step S7. Of course, if the current speed stage is the lowest speed stage, such that a down-shift is not possible at step S6, the routine proceeds to step S7 while maintaining the current speed stage.

At step S7 the engine 2 is started by way of the engagement of the first clutch 3. Then, at step S8 the shift control (down-shift) according to the ordinary shift pattern of FIG. 8 is carried out, and this control is terminated as the control shifts to the normal drive control. Here, when the target shift has already been achieved at the down-shift at step S6, the shift is not carried out at step S8. Control is then terminated, and the shift of the automatic transmission is controlled according to the normal shift pattern of FIG. 8.

Figure 5:
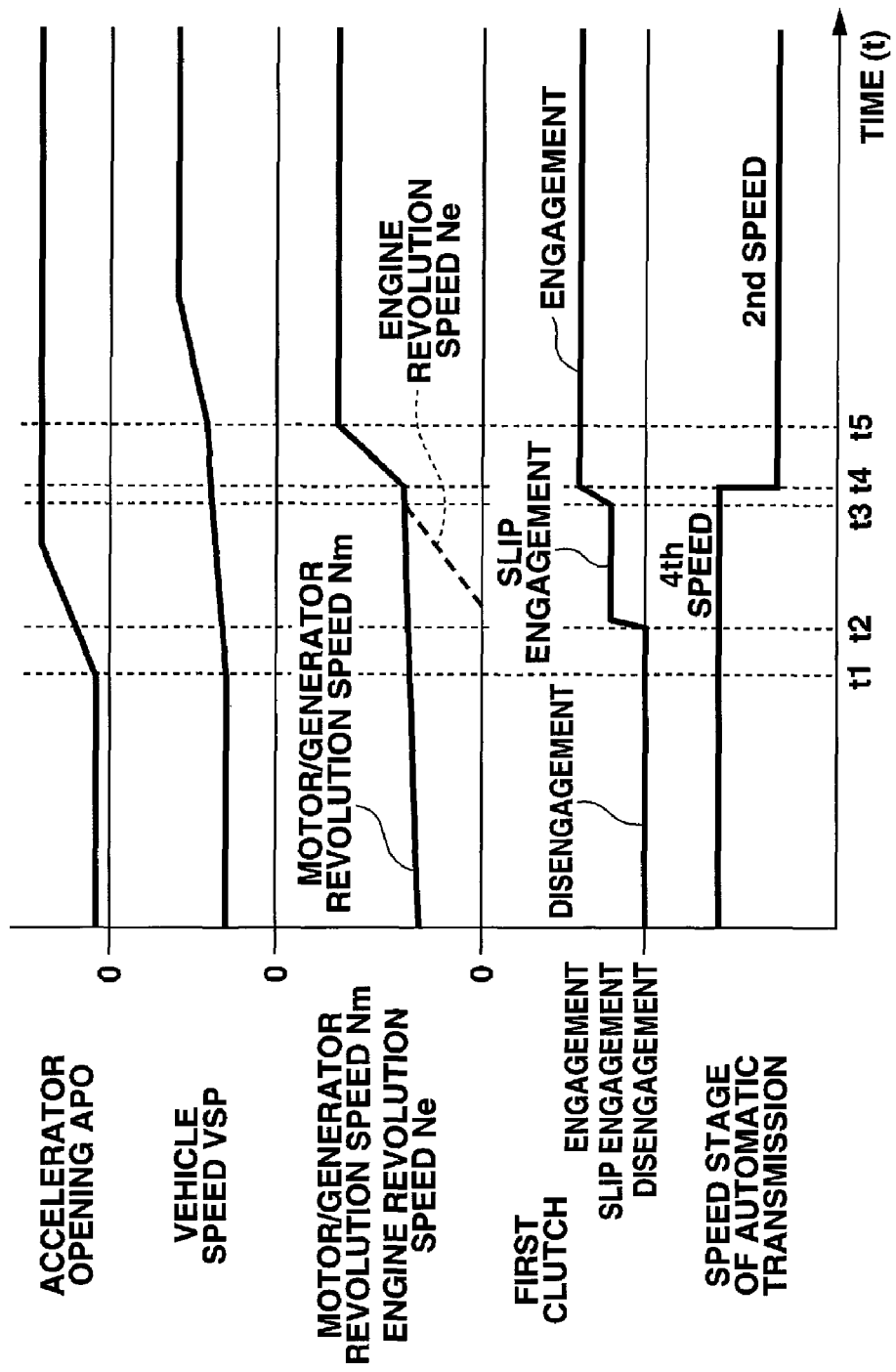
FIG. 5 is an operation time chart explaining an example of an operation when a gentle acceleration is required by the engine start control system.
Figure 6:
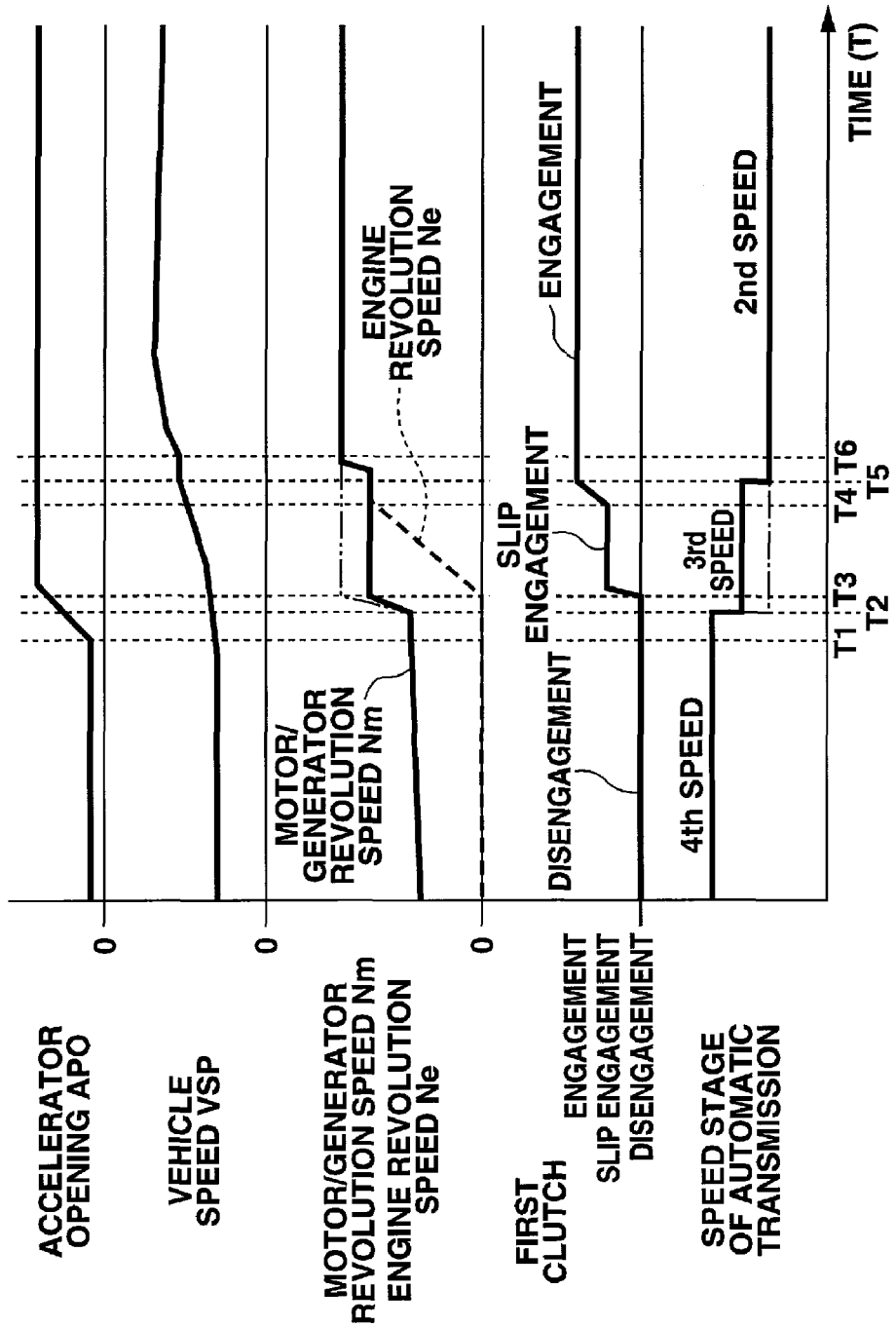
FIG. 6 is an operation time chart explaining an example of an operation when an abrupt or sudden acceleration is required by the engine start control system.

Next, operation of each part of the vehicle when starting the engine 2 from the EV drive according to the above control program is explained with reference to the time charts shown in FIGS. 5 and 6 in comparison with the case where the engine 2 is started from the EV drive by using only the normal shift pattern without using the engine start shift pattern. FIG. 5 is an example of a mode change operation from the EV drive mode the HEV drive mode in response to a gentle acceleration request during the EV drive mode. FIG. 6 is an example of a mode change operation from the EV drive mode to the HEV drive mode in response to a sudden acceleration request during the EV drive mode.

In FIG. 5, initially the vehicle travels in the EV drive mode by only the power from the motor/generator 1 with the first clutch 3 released (disengaged) and with the shift of the automatic transmission 5 selected to 4th speed. Then, the accelerator pedal is gently depressed at time t1. Subsequently, at time t2 the first clutch 3 begins to transition from disengagement to engagement by slip engagement of the clutch 3. The slip engagement of the first clutch 3 causes the revolution speed of the engine 2 to increase until the engine 2 reaches a predetermined revolution speed. Once the engine 2 reaches the predetermined revolution speed, fuel is supplied to the engine 2, and the engine 2 is started. At time t3 the revolution speed of the engine 2 and the revolution speed of the motor/generator 1 are synchronized, and the first clutch 3 begins to transition from slip engagement to complete engagement. At time t4, the first clutch 3 is completely engaged, and the mode change to the hybrid drive mode is completed. At the same time, the down-shift from 4th speed to 2nd speed is performed in the automatic transmission 5 based on the shift pattern of FIG. 8, and the down-shift is finished at time t5.

In the example shown in FIG. 6, initially the vehicle travels in the same drive mode as shown in FIG. 5. Then, the accelerator pedal is rapidly depressed at time t1. A down-shift from 4th speed to 3rd speed is performed in the automatic transmission 5 at time t2 based on the shift pattern of FIG. 4 as shown by the solid line in FIG. 6. The down-shift is completed at time t3, and, at the same time, the first clutch 3 begins to transition from disengagement to engagement by slip engagement of the clutch 3. The slip engagement of the first clutch 3 causes the revolution speed of the engine 2 to increase until the engine 2 reaches a predetermined revolution speed. Once the engine 2 reaches the predetermined revolution speed, fuel is supplied to the engine 2, and the engine is started. At time t4 the revolution speed of the engine 2 and the revolution speed of the motor/generator 1 are synchronized, and the first clutch 3 begins to transition from slip engagement to complete engagement. At time t5 the first clutch 3 is completely engaged, and the mode change to the hybrid drive mode is completed. At the same time, the down-shift from 3rd speed to 2nd speed is performed in the automatic transmission 5 based on the shift pattern of FIG. 8. The down-shift is finished at time t6.

For comparison, a mode change operation from the EV drive mode to the HEV drive mode using the normal shift pattern (FIG. 8) without using the engine start shift pattern of FIG. 4 is explained. Initially, the vehicle travels in the same drive mode as the above-mentioned examples shown in FIGS. 5 and 6. When the accelerator pedal is rapidly depressed at time t1 as shown in FIG. 6, down-shift from 4th speed to 2nd speed is performed in the automatic transmission 5 based on the shift pattern from time t2 as shown by the one-dot chain line in FIGS. 6 and 8. By this shift, as shown by the two-dot chain line in FIG. 6, the revolution speed Nm of the motor/generator greatly increases before the engine start. Due to this increase, the driving motor torque Tmdrv is remarkably lowered. For this reason, an unpleasant deceleration feeling experience in conventional hybrid vehicles can result, as mentioned above, and also this results in response delay.

As is clear from the above explanation, in the engine start control system of the hybrid vehicle taught herein, when the engine start request arises at the EV drive, the controller 7 starts the engine 2 by the engine-cranking-torque of the motor/generator 1 by engaging the first clutch 3 after controlling the shift of the automatic transmission according to the engine start shift pattern of FIG. 4, which is set to the higher or upper speed stage side than the normal shift pattern of FIG. 8.

Accordingly, the increase of the motor revolution speed caused by the shift at the engine start request can be reduced. The decrease of the available output maximum motor torque of the motor/generator 1 can be, therefore, lowered or suppressed. As a result, the decrease of the driving motor torque, which is the value obtained by subtracting the predetermined engine-cranking-torque needed for the engine start from the available output maximum motor torque, can be also reduced or suppressed. It is therefore possible to avoid giving the driver the unpleasant deceleration feeling due to the decrease of the driving motor torque at the engine start. Further, since the shift of the automatic transmission 5 is controlled in accordance with the engine start shift pattern before the engine start, it is possible to respond quickly to the acceleration request of the driver.

Further, the motor/generator 1 is set so that the motor/generator 1 rotates within the rotation range in which the driving motor torque is greater than or equal to the predetermined value. In other words, the motor/generator 1 is set so that the motor/generator 1 rotates within the rotation range in which the limitation does not arise for the driving motor torque. Therefore, there is no decrease or drop of the driving motor torque at the engine start from the EV drive.

Furthermore, in the case where the acceleration request arises at the EV drive and also the depression velocity ASP of the accelerator pedal is faster or larger than a predetermined velocity (namely that the accelerator pedal depression velocity ASP for the vehicle speed VSP is on the judgment line δ or over the judgment line δ on the acceleration request state judge map of FIG. 3), after controlling the performance of the down-shift of the automatic transmission 5 under the condition where the motor/generator 1 rotates within the rotation range in which the value of the engine-cranking-torque becomes over the predetermined value (that is, in accordance with the engine start shift pattern), the engine 2 is immediately started by the engine-cranking-torque of the predetermined torque value. That is to say, first, by producing an accelerating force by way of the performance of the down-shift, it is possible to respond quickly to the driver's sudden acceleration request. Then, after that, by performing the engine start that requires more time than the down-shift, a driving force that the driver requests by the depression of the accelerator pedal can be obtained or achieved. On the other hand, in the case where the depression velocity ASP of the accelerator pedal is slower or smaller than the predetermined velocity (namely that the accelerator pedal depression velocity ASP for the vehicle speed VSP is under the judgment line δ on the acceleration request state judge map of FIG. 3), before the down-shift control of the automatic transmission 5 and the increase of the revolution speed of the motor/generator 1, the engine 2 is started by the engine-cranking-torque. More specifically, for the gentle acceleration request, not performing the down-shift first particularly, but by performing the engine start first, priority is given to the achievement of the driving force that the driver requests by the depression of the accelerator pedal. As a consequence, the engine 2 can be started from the EV drive in response to the driver's intention to accelerate.

Although the invention has been described above by reference to certain embodiments of the invention, the invention is not limited to those described above and could be changed as appropriate within the scope of the description of the claims. For instance, the automatic transmission 5 is not limited to the above-described multi-speed stage transmission or multi-range transmission, but it could be a non-stage transmission (or stepless transmission) such as a CVT. In this case, the transmission ratio of this transmission is controlled so that the motor/generator 1 rotates within the rotation range (for example, under 1800 rpm in the case of FIG. 7A) in which the above-explained driving motor torque is maintained over the predetermined value.

As described above, according to the engine start control system, by appropriately controlling the shift of the transmission and timing of the engine start, it is possible to prevent giving the driver an unpleasant deceleration feeling due to the decrease of the driving motor torque at the engine start, while securing the predetermined value of the engine-cranking-torque needed for the engine start from the electric drive (EV) mode and while obtaining the driving motor torque of the predetermined value or more. Further, since the shift of the transmission is controlled based on the engine start shift pattern before the engine start, it is possible to respond to the acceleration request of the driver without the delay.

The above-described embodiments have been described in order to allow understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An engine start control system for a hybrid vehicle including an engine, a motor/generator, a first clutch disposed between the engine and the motor/generator, a transmission connected to the motor/generator and configured to provide a driving torque to at least one driving wheel, wherein the first clutch is configured to engage and disengage the engine with respect to the motor/generator to define an electric drive mode in which the first clutch is disengaged and the driving torque is provided only by the motor/generator, and a hybrid drive mode in which the first clutch is engaged and the driving torque is provided by both the engine and the motor/generator, the control system comprising:
a controller configured to:
determine when an engine start request for a mode change from the electric drive mode to the hybrid drive mode arises;
select an engine start downshift pattern for the transmission when the engine start request arises, the engine start downshift pattern being a high-geared pattern as compared with the normal downshift pattern for the transmission;
perform shift control of the transmission in accordance with the engine start downshift pattern when the engine start request arises; and
engage the first clutch and start the engine using an engine-cranking-torque of the motor/generator after performing the shift control.

2. The control system according to claim 1 wherein:
the controller is further configured to perform the shift control of the transmission in accordance with the engine start downshift pattern such that the motor/generator rotates within a rotation range in which a driving motor torque obtained by subtracting the engine-cranking-torque from an available output maximum motor torque of the motor/generator is greater than or equal to a predetermined value.

3. The control system according to claim 1, further comprising:
an acceleration request detection unit that detects an acceleration request during vehicle travel in the electric drive mode; and wherein:
the controller is further configured to detect the engine start request in response to detection of the acceleration request.

4. The control system according to claim 3 wherein:
the acceleration request detection unit is configured to judge whether the acceleration request is a gentle acceleration request or a sudden acceleration request based on a depression velocity of an accelerator pedal of the hybrid vehicle; and wherein:
the controller is configured to:
perform the shift control of the transmission in accordance with the engine start downshift pattern when the engine start request arises and when the acceleration request detection unit detects the gentle acceleration request by maintaining a shift state of the transmission while engaging the first clutch and starting the engine; and
perform the shift control of the transmission in accordance with the engine start downshift pattern when the engine start request arises and when the acceleration request detection unit detects the sudden acceleration request by down-shifting the transmission in accordance with the engine start downshift pattern prior to engaging the first clutch and starting the engine.

5. The control system according to claim 4, wherein:
the controller is configured to perform shift control of the transmission in accordance with the normal downshift pattern after starting the engine.

6. The control system according to claim 1 wherein:
the controller is configured to perform shift control of the transmission in accordance with the normal downshift pattern after starting the engine.

7. An engine start control system for a hybrid vehicle including an engine, a motor/generator, a first clutch disposed between the engine and the motor/generator, a transmission connected to the motor/generator and configured to provide a driving torque to at least one driving wheel, wherein the first clutch is configured to engage and disengage the engine with respect to the motor/generator to define an electric drive mode in which the first clutch is disengaged and the driving torque is provided only by the motor/generator, and a hybrid drive mode in which the first clutch is engaged and the driving torque is provided by both the engine and the motor/generator, the control system comprising:
means for determining when an engine start request for a mode change from the electric drive mode to the hybrid drive mode arises;
means for selecting an engine start downshift pattern for the transmission when the engine start request arises, the engine start downshift pattern being a high-geared pattern as compared with the normal downshift pattern for the transmission;

means for performing shift control of the transmission in accordance with the engine start downshift pattern when the engine start request arises;

means for engaging the first clutch after performing the shift control; and means for starting the engine using an engine-cranking-torque of the motor/generator after engaging the first clutch.

8. An engine start control method for a hybrid vehicle including an engine, a motor/generator, a first clutch disposed between the engine and the motor/generator, a transmission connected to the motor/generator and configured to provide a driving torque to at least one driving wheel, wherein the first clutch is configured to engage and disengage the engine with respect to the motor/generator to define an electric drive mode in which the first clutch is disengaged and the driving torque is provided only by the motor/generator, and a hybrid drive mode in which the first clutch is engaged and the driving torque is provided by both the engine and the motor/generator, the method comprising:

determining when an engine start request for a mode change from the electric drive mode to the hybrid drive mode arises;

selecting an engine start downshift pattern for the transmission when the engine start request arises, the engine start downshift pattern being a high-geared pattern as compared with the normal downshift pattern for the transmission;

performing shift control of the transmission in accordance with the engine start downshift pattern when the engine start request arises; and engaging the first clutch and starting the engine using an engine-cranking-torque of the motor/generator after performing the shift control.

9. The method according to claim 8, further comprising:
maintaining the driving torque provided to the at least one driving wheel greater than or equal to a predetermined value while starting the engine.

10. The method according to claim 8, further comprising:
detecting an acceleration request during the electric drive mode; and wherein determining the engine start request arises when the acceleration request is detected.

11. The method according to claim 8, further comprising:
detecting a velocity of an acceleration request during the electric drive mode; and determining whether the acceleration request is a gentle acceleration request or a sudden acceleration request based on the velocity; and wherein performing the shift control of the transmission in accordance with the engine start downshift pattern when the engine start request arises includes:

maintaining the transmission in a current shift state while engaging the first clutch and starting the engine when the acceleration request is the gentle acceleration request; and down-shifting the transmission according to the engine start downshift pattern before engaging the first clutch and starting the engine when the acceleration request is the sudden acceleration request.

12. The method according to claim 11, further comprising:
operating the transmission according to the normal downshift pattern after starting the engine.

13. The method according to claim 12 wherein operating the transmission according to the normal downshift pattern after starting the engine comprises:

down-shifting the transmission according to the normal downshift pattern after starting the engine when the acceleration request is the gentle acceleration request.

14. The method according to claim 8, further comprising:
operating the transmission according to the normal downshift pattern after starting the engine.

* * * * *